United States Patent
Nilsson

(10) Patent No.: US 9,509,354 B2
(45) Date of Patent: Nov. 29, 2016

(54) HOMODYNE RECEIVER WITH IMPROVED LINEARITY

(71) Applicant: TELEFONAKTIEBOLAGET L M ERICSSON (PUBL), Stockholm (SE)

(72) Inventor: Göran Nilsson, Hisings Backa (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/435,928

(22) PCT Filed: Oct. 31, 2012

(86) PCT No.: PCT/EP2012/071576
§ 371 (c)(1),
(2) Date: Apr. 15, 2015

(87) PCT Pub. No.: WO2014/067571
PCT Pub. Date: May 8, 2014

(65) Prior Publication Data
US 2015/0256210 A1    Sep. 10, 2015

(51) Int. Cl.
H04B 1/26    (2006.01)
H04B 1/30    (2006.01)
H04B 15/06   (2006.01)

(52) U.S. Cl.
CPC .............. *H04B 1/30* (2013.01); *H04B 15/06* (2013.01); *H04B 2001/305* (2013.01)

(58) Field of Classification Search
CPC ...... H04B 1/30; H04B 10/142; H04B 10/63; H04B 10/615; H03D 1/22
USPC ................................ 455/324, 310, 318, 307
See application file for complete search history.

(56) References Cited

U.S. PATENT DOCUMENTS

| | | | | |
|---|---|---|---|---|
| 5,530,929 A | * | 6/1996 | Lindqvist | H04B 1/30 455/310 |
| 5,661,485 A | * | 8/1997 | Manuel | H04B 1/30 342/100 |
| 5,850,598 A | * | 12/1998 | Behrent | H04B 1/30 455/307 |
| 7,327,198 B2 | * | 2/2008 | Pan | H04B 15/06 331/38 |
| 2006/0094362 A1 | | 5/2006 | Pan | |

* cited by examiner

*Primary Examiner* — Sonny Trinh
(74) *Attorney, Agent, or Firm* — Rothwell, Figg, Ernst & Manbeck, P.C.

(57) ABSTRACT

A homodyne receiver (100, 200, 300), comprising a first mixer (115, 215, 315) with an RF input port (105, 213, 313) and an LO input port (110, 214, 314) for an LO signal and an output port (120, 217, 317) for the output signal of the first mixer which is also arranged to be the output port of the homodyne receiver. The homodyne receiver (100, 200, 300) also comprises a control unit (125) for controlling signal leakage from the LO input port (110, 214) to the RF input port (105, 213) of the first mixer (115, 215). The control unit (125) is arranged to control the leakage in amplitude and phase so that second-order distortion products and third order distortion products which are created when the RF and LO signals are mixed in the first mixer (115, 215) exhibit similar amplitudes but a phase difference of 180 degrees.

7 Claims, 3 Drawing Sheets

HOMODYNE RECEIVER WITH IMPROVED LINEARITY

CROSS REFERENCE TO RELATED APPLICATION(S)

This application is a 35 U.S.C. §371 National Phase Entry Application from PCT/EP2012/071576, filed Oct. 31, 2012, designating the United States, the disclosure of which is incorporated herein in its entirety by reference.

TECHNICAL FIELD

The present invention discloses a homodyne receiver with improved linearity.

BACKGROUND

In a homodyne receiver, a received Radio Frequency, RF, signal is mixed with a signal from a Local Oscillator, an LO signal, in order to convert it to a baseband signal. The mixing of the LO signal and the RF signal is carried out in a mixer circuit.

A drawback with a homodyne receiver is its sensitivity to interfering signals within the RF bandwidth. Such interfering signals will be converted to baseband level via non-linear elements in the receiver. At the baseband level, the interfering signal will be at the same frequency as "the information signal", thus ruling out the use of filters in order to remove the interfering signal. Thus, interfering RF signals will degrade the performance of a homodyne receiver.

An interfering RF signal will give rise to second and third order distortion products, defined by means of the so called IIP2 and IIP3, respectively. IIP2 is the so called Input Intercept Point for the second order distortion products, and IIP3 is the so called Input Intercept Point for the third order distortion products. The second and third order distortion products are sometimes also referred to as second and third order distortion terms, or simply second and third order distortion. At baseband, BB, level, of a homodyne receiver, the baseband equivalent output interference power level due to second and third order distortion products, here written as $P_{BB,IIP2}$ and $P_{BB,IIP3}$, will be:

$$P_{BB,IIP2} = 2 * P_{interferer} - IIP2 + const_1 \text{ [dBm]} \quad (1)$$

$$P_{BB,IIP3} = 2 * P_{interferer} + P_{LOleakage} - IIP3 + const_2 \text{ [dBm]} \quad (2)$$

In (1) and (2) above, the term $P_{interferer}$ is the input power at RF level of the interfering signal, and "$const_1$ and $const_2$" are constant terms, which may or may not be the same in both equations.

From (2) above, we also see that for the third order distortion products, $P_{BB,IIP3}$, the leakage from the LO signal will be of significance.

From (1) and (2) above, we also learn that in order to minimize the adverse effects of second and third order distortion products, a homodyne receiver needs to have high IIP2 and IIP3, since this will give a low baseband equivalent input interference power level as measured in dBm. For the same reason, in the case of third order distortion products, the homodyne receiver should have a low LO leakage.

These demands, i.e. high IP2 and IIP3 as well as low LO leakage, lead to an increase in complexity and power consumption of a homodyne receiver, which is naturally not desirable.

SUMMARY

It is an object to obviate at least some of the disadvantages of homodyne receivers as described above, in particular the disadvantages associated with second and third order distortion products.

This object is obtained by means of a homodyne receiver which comprises a first mixer with an RF input port for an RF signal and an LO input port for an LO signal as well as an output port for the output signal of the mixer, which is also the output port of the homodyne receiver.

The homodyne receiver also comprises a control unit for controlling signal leakage from the LO input port to the RF input port, and the control unit is arranged to control this leakage in amplitude and phase so that second-order distortion products and third order distortion products which are created when the RF and LO signals are mixed in the mixer exhibit similar amplitudes but a phase difference of 180 degrees.

In this manner, since the second and third order distortion products will exhibit similar amplitudes but a phase difference of 180 degrees, they will cancel each other, which is advantageous to the performance of the homodyne receiver. The invention capitalizes on the fact that, as seen in equation (2) above, the level of interference due to the third-order distortion products varies with the level of the LO leakage, and, in a similar manner, the phase of the third-order distortion products varies with the phase of the LO leakage. Thus, if, as is done in the homodyne receiver outlined above, the phase and the amplitude of the LO leakage are controlled properly, the second and third order distortion products will cancel each other.

In embodiments, the homodyne receiver comprises a second mixer which comprises an RF input port and an LO input port and an output port. The homodyne receiver is arranged to split RF and the LO input signals into first and second parts. In the homodyne receiver, the first parts of the LO and RF signals are fed to the first mixer, and the second parts of the LO and RF signal are fed to the second mixer, and the homodyne receiver comprises means for phase shifting the second part of the LO signal by ninety degrees before it is fed to the second mixer. The control unit is arranged to also control signal leakage from the LO input port to the RF input port in the second mixer, and to also control said leakage in the second mixer so that second-order distortion products and third order distortion products which are created when the RF and LO signals are mixed in the second mixer exhibit similar amplitudes but a phase difference of 180 degrees.

In embodiments, the homodyne receiver comprises a connection for an input LO signal to a combining means which is also comprised in the homodyne receiver, so that an input LO signal to the homodyne receiver is input both to the LO input ports of the first and second mixers and to the combining means. The combining means are also arranged to receive an RF signal which is input to the homodyne receiver, and to output its combined signal to the RF input ports. In the homodyne receiver, the control unit is arranged to control the leakage from the LO port(s) to the RF port(s) by means of controlling the amplitude and phase of the LO signal before it is input to the combining means.

In embodiments, the homodyne receiver comprises a first and a second DC offset signal generator. The first offset signal generator is connected to the first mixer and the second offset signal generator is connected to the second mixer. In the homodyne receiver, the control unit is arranged to control the leakage from the LO port(s) to the RF port(s) by means of controlling the level of the first and second DC offset signals.

In embodiments of the homodyne receiver, the control unit is arranged to receive part of the output signal from the mixer or mixers, and to adaptively exercise control of said leakage in amplitude and phase.

BRIEF DESCRIPTION OF THE DRAWINGS

The invention will be described in more detail in the following, with reference to the appended drawings, in which.

DETAILED DESCRIPTION

Figure 1:
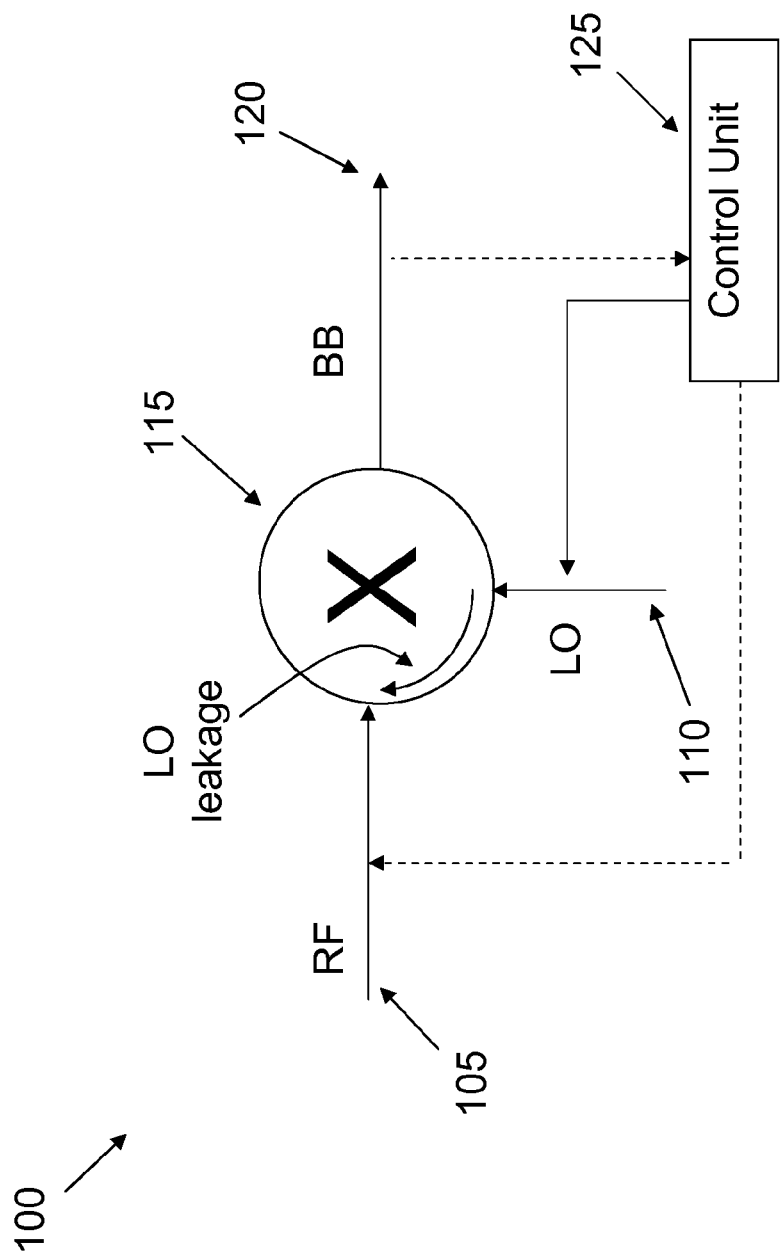
FIG. 1 shows a first embodiment of a homodyne receiver.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a first embodiment of a homodyne receiver 100. The homodyne receiver 100 comprises a mixer 115, which has an input port 105 for an RF signal and an input port 110 for an LO signal. The mixer 115 also comprises an output port 120 for the (mixed) product of the input RF and LO signals, which is a baseband, BB, signal, as shown in FIG. 1.

In the mixer 115, there will be a signal leakage from the LO port 110 to the RF port 105. As indicated in FIG. 1, the homodyne receiver 100 comprises a control unit 125 which controls the signal leakage from the LO input port to the RF input port in amplitude and phase so that second-order distortion products and third order distortion products which are created when the RF and LO signals are mixed in the mixer exhibit similar amplitudes but a phase difference of 180 degrees.

The control unit is in one version set to create an LO leakage at a certain level and with a certain phase, so that the second and third order distortion products will cancel each other as described above. In such a version, the level and phase of LO leakage is factory set, i.e. the necessary level and phase of LO leakage are determined in connection with the production of the homodyne receiver 100, and the control unit 125 is then arranged to keep the LO leakage to the pre-set level.

In another version, as indicated by means of a dashed arrow in FIG. 1, the control unit 125 is arranged to measure the level of the second and third order distortion products in the output BB signal at the port 120, and to then vary the level and phase of the LO leakage until a minimum level of second and third order distortion products are found in the output BB signal at the port 120. One way of measuring the level of the second and third order distortion products in the output BB signal at the port 120 is to see the second and third order distortion products as noise, and to then measure the noise at the port 120, and to then vary the level and phase of the LO leakage until a minimum level of noise is found at the port 120.

Figure 2:
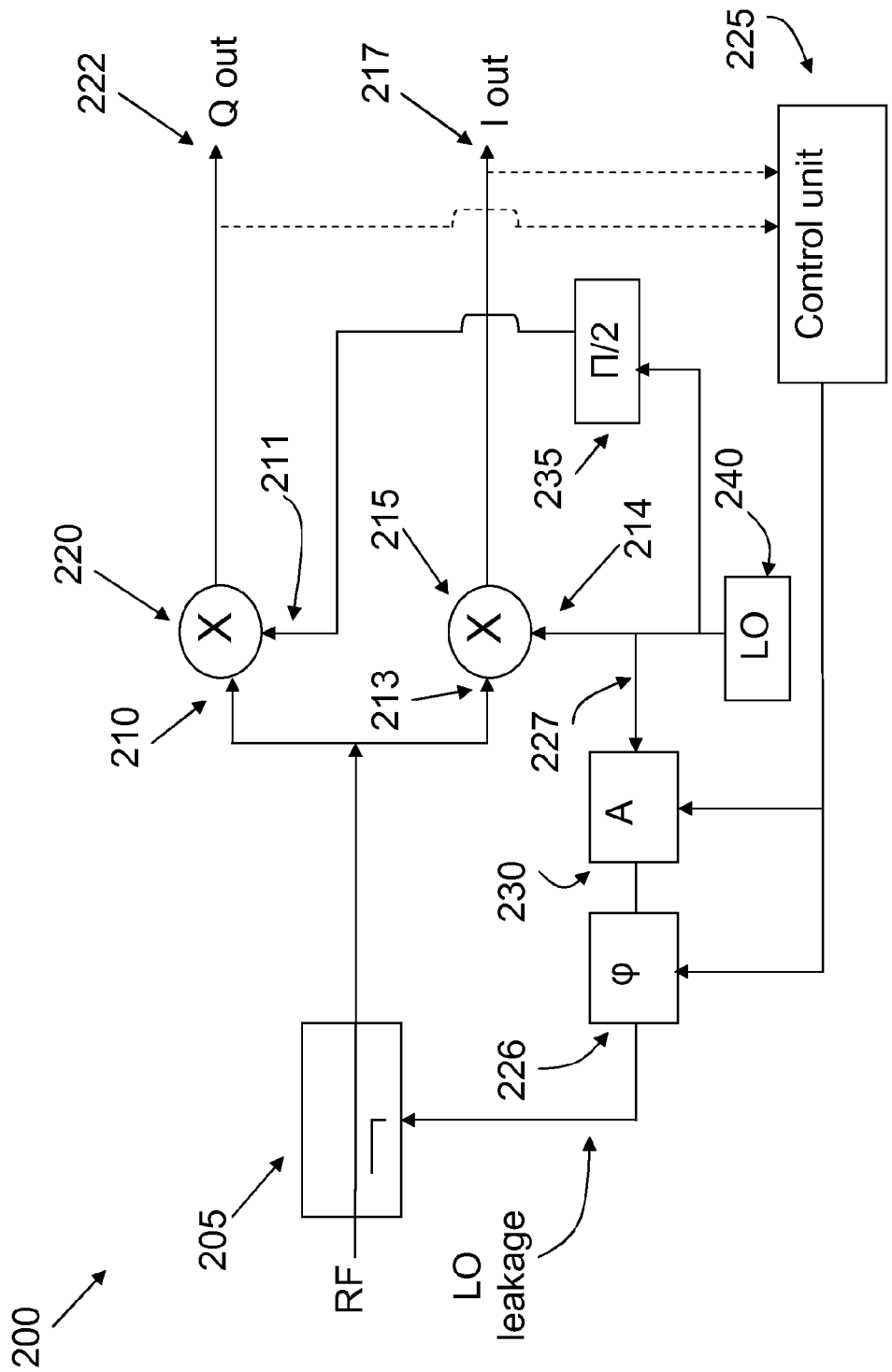
FIG. 2 shows a second embodiment of a homodyne receiver.

In one embodiment 200, which is shown in FIG. 2, the homodyne receiver comprises both a first 215 and a second mixer 220. The first mixer 215 comprises an RF input port 213, an LO input port 214, and an output port 217, and the second mixer 220 comprises an RF input port 210, an LO input port 211 and an output port 222.

As shown in FIG. 2, the homodyne receiver 200 is arranged to split an input signal into first and second (suitably equal) parts, with the first part being fed to the RF input port 213 of the first mixer 215, and the second part being fed to the RF input port 210 of the second mixer 220. The exact details of how the RF signal is split into two parts can be varied in a variety of ways, with one alternative being a simple two-way splitter.

FIG. 2 also shows an LO source 240, which can either be comprised in the homodyne receiver 200, or, alternatively, the LO source 240 can be external to the homodyne receiver 200. As shown in FIG. 2, the homodyne receiver 200 is arranged to split the LO signal from the LO source 240 into first and second (suitably equal) parts. In similarity to the RF signal, the first part of the LO signal is fed to the LO input port 214 of the first mixer 215, and the second part of the LO signal is fed to the LO input port 211 of the second mixer 220. However, the homodyne receiver 200 also comprises means 235 (e.g. a phase shifter) for phase shifting the second part of the LO signal by ninety degrees before it is fed to the second mixer 220, so that it is the phase shifted second part of the LO that is fed to the second mixer 220. Thus, the first mixer 215 becomes an "in-phase" mixer, i.e. an "I-mixer", and the second mixer 220 becomes a "quadrature mixer", i.e. a "Q-mixer", and their respective output signals are in FIG. 2 referred to as "I out" and "Q out".

The homodyne receiver 200 comprises a control unit 225, which is arranged to control signal leakage from the LO input port to the RF input port in both the first 215 and the second 220 mixer so that the second-order distortion products and the third order distortion products which are created when the RF and LO signals are mixed in each of the first and second mixers exhibit similar amplitudes but a phase difference of 180 degrees. In this manner, the second and the third order distortion products in the mixers 215, 220 will cancel each other in the mixers, which will create "pure" I and Q signals at the output ports 217, 222.

The manner in which the control unit 225 is arranged to perform the task of controlling signal leakage is as follows: as can be seen in FIG. 2, there is arranged a connection 227 from the LO source 240 to means 230 for altering the amplitude of a signal and means 226 for altering the phase of a signal. By means of the connection 227, a part of the signal from the LO source 240 is fed to the means 230 for altering the amplitude of a signal, and from there to the means 226 for altering the phase of a signal. The part of the LO signal that is fed via the connection 227 is suitably in the range of 1%-0.001% of the total signal which is output from the LO source 240. The low percentage of the LO signal that is fed via the connection 227 is the reason that the splitting of the LO signal from the LO source 240 is mentioned as being into first and second (suitably equal) parts, as opposed to mentioning a three way-split: the percentage that is "lost" via the connection 227 is very low.

The amplitude altering means 230 is suitably an amplifier or an attenuator, and the phase shifting means 226 is suitably a phase shifter, and will be referred to as an amplifier and a phase shifter, respectively, in the following, although this is by way of example only.

The phase shifter 226 and the amplifier 230 are shown in FIG. 2 as two separate components connected in series, which is only one example; the same result can be achieved in other ways as well, which are also encompassed by the invention. There can, for example, be one component which alters both the amplitude and the phase of a signal, or the phase shifter 226 and the amplifier 230 can be connected in series with the phase shifter first, as opposed to the order in which they are shown in FIG. 2.

As shown in FIG. 2, the homodyne receiver 200 comprises combining means 205 such as e.g. a directional coupler, which serves to combine an input RF signal with the signal which has been "leaked" from the LO source 240 via the connection 227 and then passed through the means 230, 225 for altering amplitude and phase. It is thus the combined signal which is fed to the RF input ports of the mixers 215, 220, as described above.

Since the signal which is fed to the RF input ports of the first and second mixers comprise a portion of the LO signal which is controlled in phase and amplitude by the control unit 225, the LO leakage from the LO ports 214, 211 in each of the mixers 215, 220, can be cancelled by means of letting the control unit 225 set the phase shift and amplitude of the portion of the LO signal which is fed to the combining means 205.

As explained previously, since the third order distortion products comprise a term from the LO leakage, the sum of the second and the third order distortion products can be made to cancel each other by controlling the amplitude and phase of the leakage of the LO signal. In the embodiment of FIG. 2, an "artificial LO leakage" is created by means of the connection 227 and the combiner 205, with the phase and amplitude of the artificial leakage being controlled by the control unit 225 through the means 226 and 230.

The phase shift and amplitude of the "artificial LO leakage" caused in the manner described above can either be set once and for all, e.g. during production of the homodyne receiver 200, in which case they are kept constant by the control unit 225, or the control unit 225 can be arranged to detect and measure the I and Q signals at the output ports 217, 222, and to adaptively control the phase shifter 225 and the amplifier 230 in order to make the sum of the second and the third order distortion products cancel each other by controlling the amplitude and phase of the leakage of the LO signal. As explained above in connection with the description of the embodiment 100, one way of measuring the level of the sum of the second and third order distortion products in the output BB signal at the output ports 222, 217, is to see the second and third order distortion products at each of these output ports as noise and to measure the noise at these ports in order to then vary the level and phase of the LO leakage by means of the components 230 and 226 until a minimum level of noise is found at the ports 222, 217. It can be mentioned here that by using the component 225 to vary the phase of the LO signal from the connection 227, the proportion of the total LO signal that is fed to the I-mixer 220 and the Q-mixer 215 can be varied adaptively, as explained in the following.

The homodyne receiver 200 of FIG. 2 can also serve to remove distortion products from both the I mixer 215 and the Q mixer 220 even if the two mixers have different IIP2: by adjusting the phase of the "artificial leakage", which is done by means of the phase shifter 225 in the following manner: If the phase of the "artificial LO leakage" is in-phase with the signal form the LO source 240, the entire third-order distortion products will end up in the I-mixer 215, and conversely, if the phase of the "artificial LO leakage" is 90 degrees shifted with respect to the signal from the LO source 240, the entire third-order distortion products will end up in the Q-mixer 220. Any combinations between these two "extremes" are also possible, so that by using the component 226 to vary the phase of the portion of the LO signal from the connection 227, the proportion of the total LO signal that is fed to the I-mixer 220 and the Q-mixer 215 can be varied adaptively.

Thus, by adjusting the "artificial LO leakage" phase it is possible to adaptively control the amount of third-order distortion products in the I-mixer and in the Q-mixer. Hence, the homodyne receiver 200 is not dependent on the mixers 215, 220, having the same IIP2.

Figure 3:
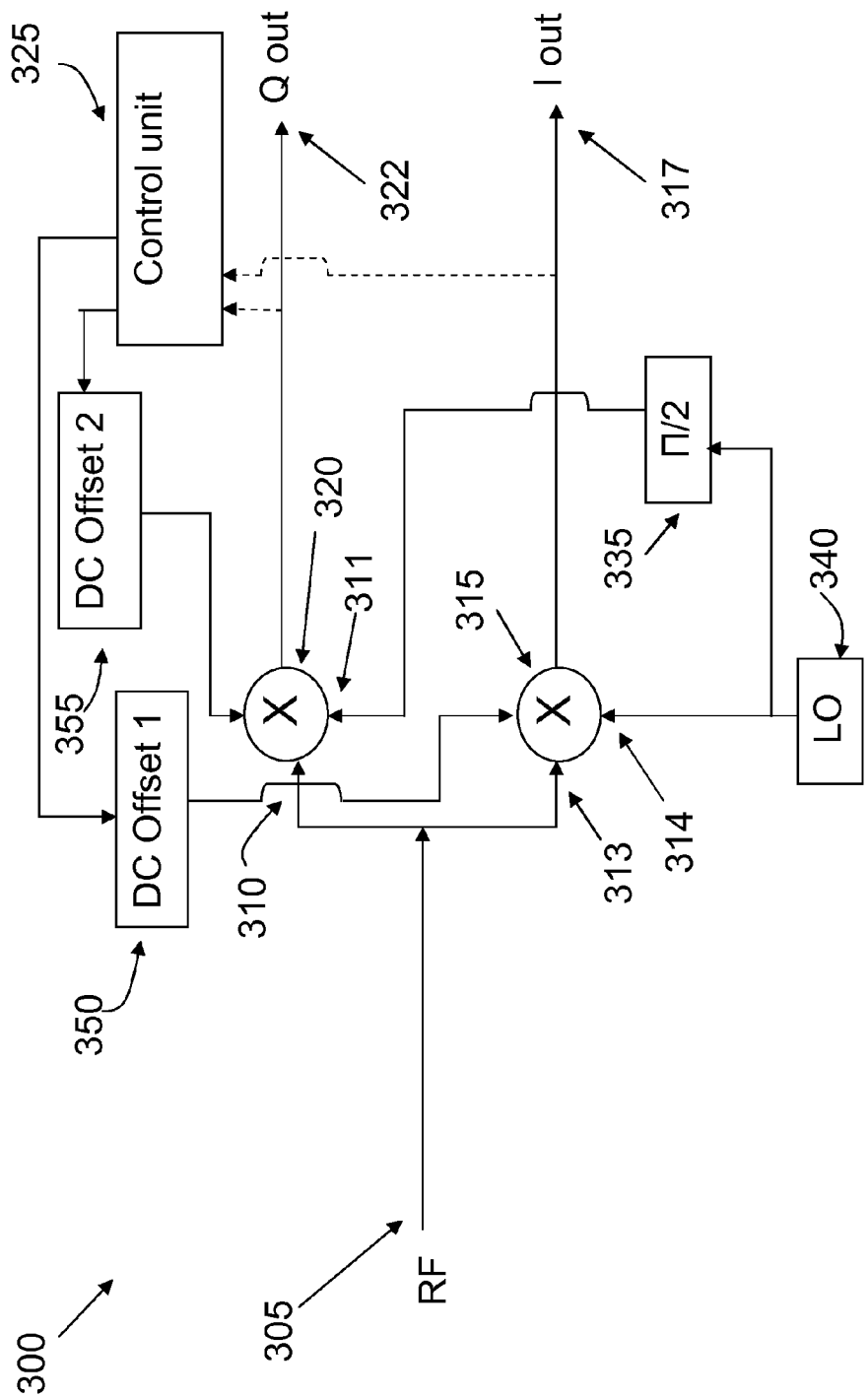
FIG. 3 shows a third embodiment of a homodyne receiver.

FIG. 3 shows a further embodiment of a homodyne receiver 300: in this embodiment, as with the embodiment 200 in FIG. 2, the homodyne receiver comprises first 315 and second 320 mixers, with respective RF input ports 313, 310, and respective LO input ports 314, 311. The first mixer 315 is the I mixer, and thus has an RF output port 317 which is shown as I out, and the second mixer 320 is the Q mixer and has an output port 322 which is shown as Q out.

The homodyne receiver 300 also comprises a first 350 and a second 355 DC offset signal generator, one for each of the mixers 315, 320, with the first DC offset signal generator 350 being connected to the I mixer 315, and the second DC offset signal generator 355 being connected to the Q mixer 320. In the homodyne receiver 300, there is also comprised a control unit 325 which in this embodiment controls the signal leakage from the LO input port 314, 311, in each of the mixers to the RF input port 310, 313, in the corresponding mixer.

In similarity to the embodiments shown previously, the control unit 325 in the embodiment 300 is arranged to control the leakage in amplitude and phase from the LO input port to the RF input port in the two mixers 315, 320, so that second-order distortion products and third order distortion products which are created when the RF and LO signals are mixed in the mixers exhibit similar amplitudes but a phase difference of 180 degrees. In the embodiment 300, this is done by means of controlling the levels of the DC offset signals to the two mixers 315, 320.

By introducing a DC offset in one or both of the mixers 315, 320 ("one or both", since the level of the DC offset may be the same in both mixers, or different, and thus may be 0 V DC in at least one of the mixers), the amplitude of the leakage from a mixer's LO input port to its RF input port can be controlled. Since the DC offset in the mixers can be controlled independently of each other, the amplitude of the LO leakage in each mixer can be controlled independently of each other, this is equivalent to independently controlling both the amplitude and phase in each mixer so that second-order distortion products and third order distortion products which are created when the RF and LO signals are mixed in the mixers exhibit similar amplitudes but a phase difference of 180 degrees, i.e. cancel each other in both of the mixers.

In similarity to the embodiments 100 and 200, the embodiment 300 also comprises a control unit 325, which is arranged to control the level of the DC offsets to the two mixers 315, 320. The level of the two DC offsets described above can either be set once and for all, e.g. during production of the homodyne receiver 300, in which case they are kept constant by the control unit 325, or the control unit 325 can be arranged to detect and measure the I and Q signals at the output ports 317, 322 in the same manner as that described above in connection with the description of the embodiment 200, and to then adaptively control the DC offset levels so that second and third order distortion products cancel each other in the output signals from both mixers 315, 320.

The DC offset signals from the DC offset signal generators 355, 350, can be introduced into the mixers in a number of ways: in one embodiment, they are introduced into the mixers 315, 320, at their LO input ports 314, 311, although they may in fact also be introduced into the mixers at their output ports, 317, 322. It is also possible to envision mixers with separate input ports for DC offset signals.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A homodyne receiver, comprising:
a first mixer with an RF input port for an RF signal, an LO input port for an LO input signal and an output port for the output signal of the first mixer, the output port arranged to be the output port of the homodyne receiver; and
a control unit configured to vary an amplitude and a phase of a signal leaked from the LO input signal such that second-order distortion products and third order distortion products created when the RF and LO input signals are mixed in the first mixer exhibit similar amplitudes but a phase difference of 180 degrees.

2. The homodyne receiver of claim 1, comprising:
a second mixer that includes an RF input port, an LO input port, and an output port, and
a phase shifter,
wherein the homodyne receiver being is further configured to split the RF and the LO input signals into first and second parts, in which the first parts of the LO input and RF signals are fed to the first mixer and the second parts of the LO input and RF signals are fed to the second mixer,
wherein said phase shifter shifts said second part of the LO signal by ninety degrees before it is fed to the second mixer,
the control unit being further configured to vary the phase and the amplitude of the signaled leaked from the LO input signal such that second-order distortion products and third order distortion products which are created when the RF and LO signals are mixed in the first and second mixers exhibit similar amplitudes but a phase difference of 180 degrees.

3. The homodyne receiver of claim 2, further comprising:
a combiner; and
a connection between the LO input signal and the combiner such that the LO input signal to the homodyne receiver is input both to the LO input ports of the first and second mixers and to the combiner, the LO input signal input to the combiner being the signal leaked from the LO input signal; and
said combiner further configured to receive the RF signal which is input to the homodyne receiver, and to output its combined signal to the RF input ports,
wherein the control unit is further configured to vary the amplitude and phase of the signal leaked from the LO input signal before it is input to the combining means.

4. The homodyne receiver of claim 1, further comprising:
a first and a second DC offset signal generator, the first offset signal generator being connected to the first mixer and the second offset signal generator being connected to the second mixer,
wherein the control unit is further configured to control the leakage from the LO input port in each of the mixers to the RF input port in each of the mixers by controlling the level of the first and second DC offset signals.

5. The homodyne receiver of claim 1, wherein the control unit is further configured to receive part of the output signal from the mixer or mixers and to adaptively vary the amplitude and phase of the signal leaked from the LO input signal.

6. The homodyne receiver of claim 1, wherein a power of the signal leaked from the LO input signal is between 0.001% to 1% of a power of the LO input signal.

7. The homodyne receiver of claim 1, wherein the control unit is further configured to measure the second and third order distortion products on the output port and adjust the amplitude and the phase of a signal leaked from the LO input signal in accordance with the measured second and third order distortion products.

* * * * *